Figure 1:
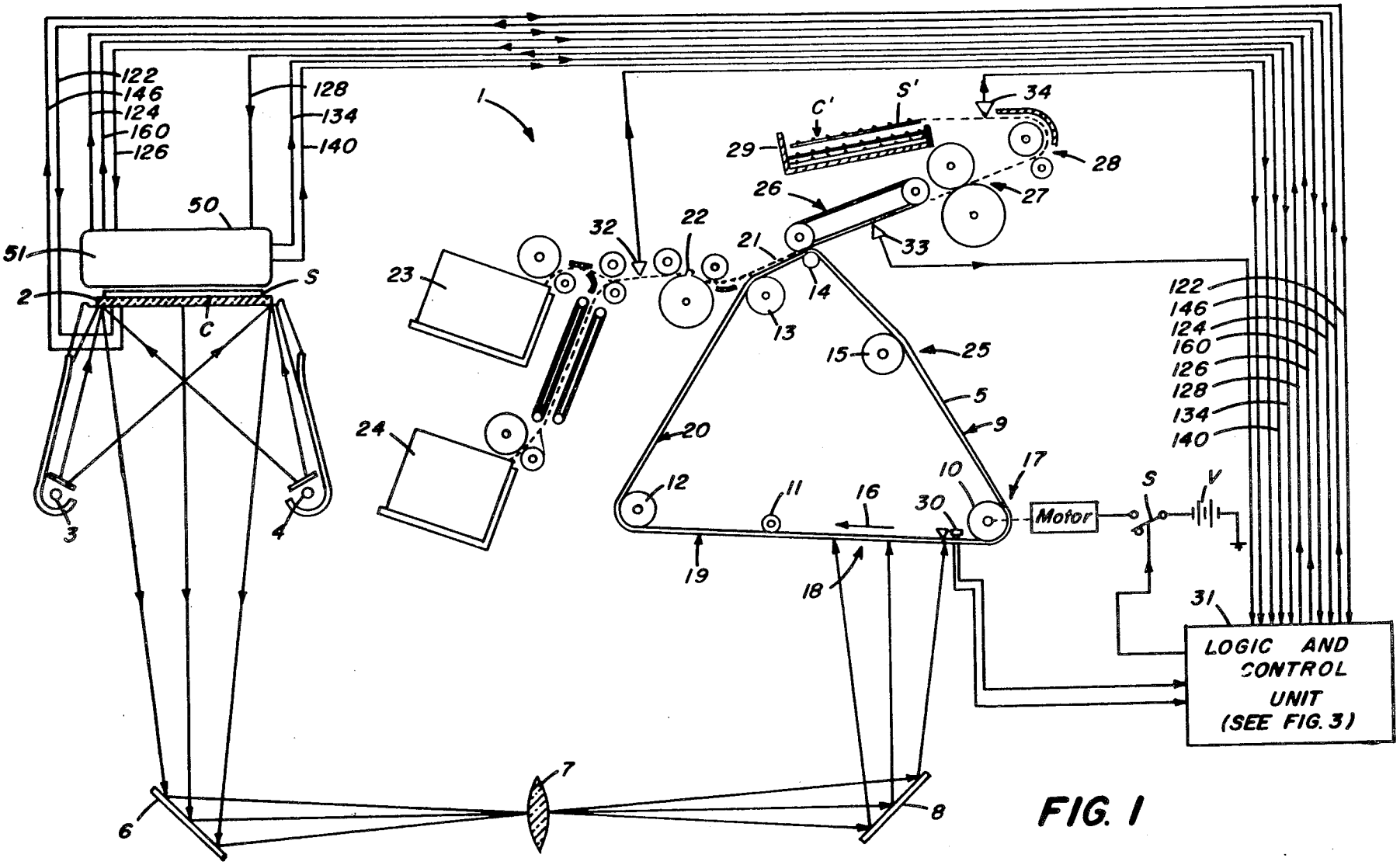
Figure 2:
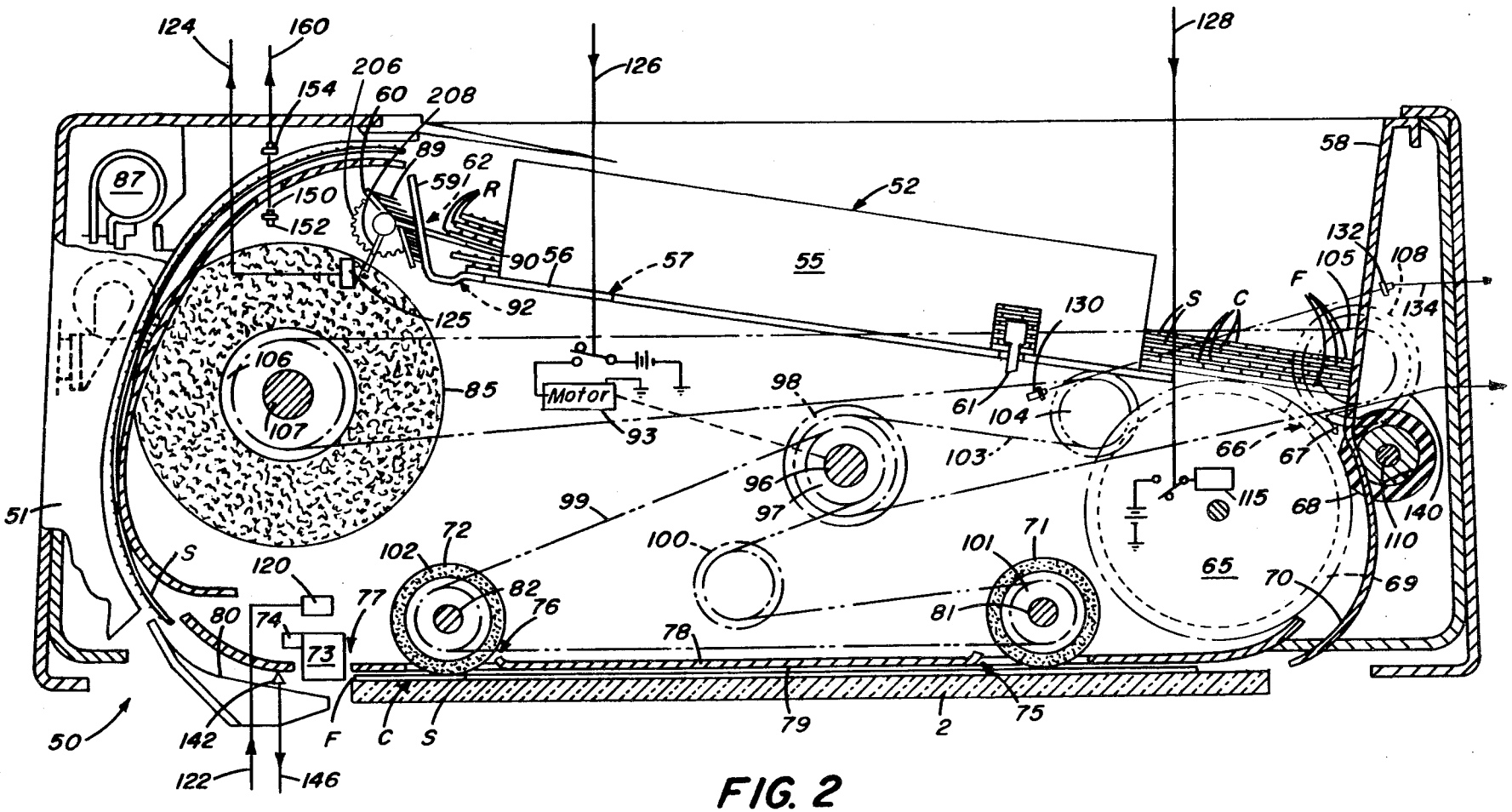
Figure 3:
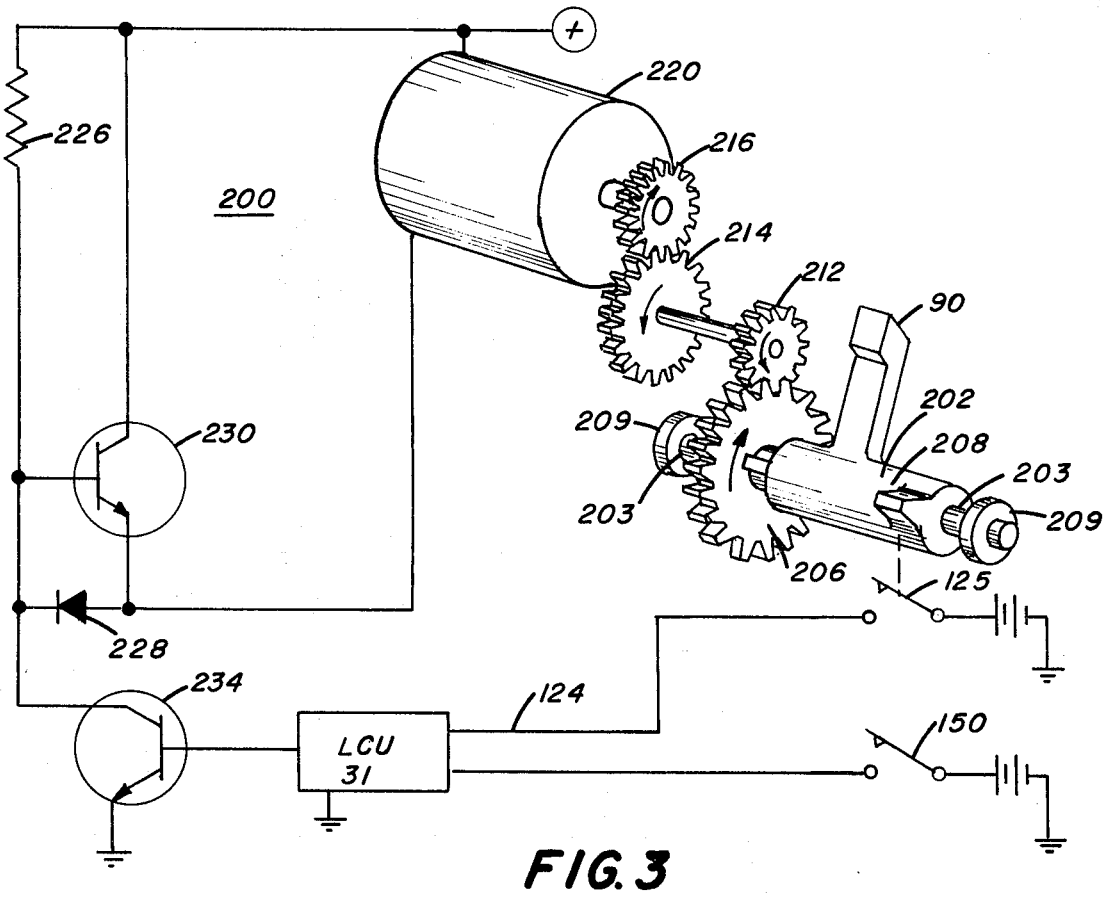

United States Defensive Publication [19] (H) [11] T964,008

Hunt [43] Nov. 1, 1977

[54] SEPARATION MEMBER RETURN MEANS FOR USE IN RECIRCULATING FEEDERS

[76] Inventor: William Edward Hunt, 901 Elmgrove Road, Rochester, N.Y. 14650

[21] Appl. No.: 781,812

[22] Filed: Mar. 28, 1977

[51] Int. Cl.[2] ..... G03B 27/48; G03B 27/50

[52] U.S. Cl. ..... 355/50; 355/66

[57] ABSTRACT

A recirculating feeder adapted to be coupled to a copier is set forth which employs a separator member that initially engages the top document sheet of a multi-sheet document in a tray and incrementally moves downwardly under the influence of gravity as individual document sheets are fed from the bottom of the multi-sheet document to the copier exposure platen and returned to the top of the multi-sheet document in the tray. After the sheet initially engaged by the separator member is fed, the separator member moves downwardly to be spaced from the tray and a motor control circuit is activated which energizes a motor. The energized motor drives the separator member towards return engagement with the top document sheet of the multi-sheet document in the tray. Prior to the separator member returning to such engagement, the control circuit de-energizes the motor and connects it to a dynamic brake circuit which retards the rotation of the motor and movement of the separator member to the extent that the separator member gently re-engages the top document sheet, and does not damage it.

2 Claims, 3 Sheets Drawing,

19 Pages Specification

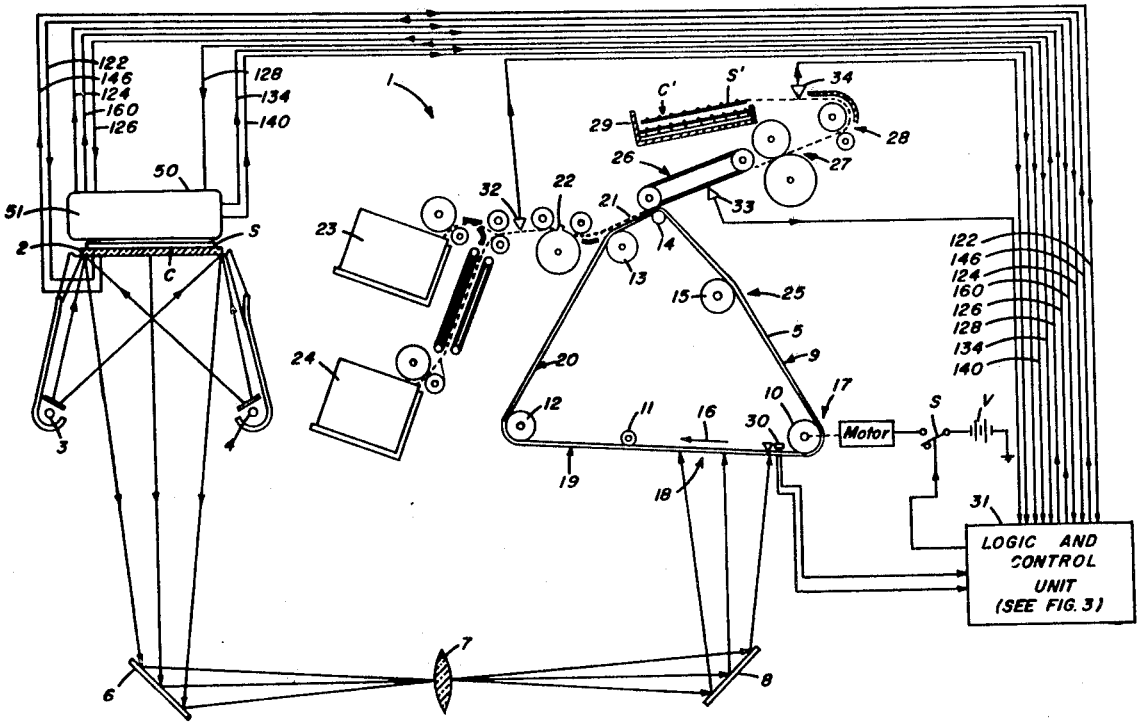

The file of this unexamined application may be inspected and copies thereof may be purchased (849 O.G. 1221, Apr. 9, 1968).